US008275003B2

(12) United States Patent
Elstermann (10) Patent No.: US 8,275,003 B2
(45) Date of Patent: Sep. 25, 2012

(54) METHOD AND APPARATUS FOR GENERATING MULTIPLEXED SIGNALS (75) Inventor: Erik Elstermann, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 1185 days.

(21) Appl. No.: 11/257,230

(22) Filed: Oct. 24, 2005

(65) Prior Publication Data
US 2007/0091857 A1    Apr. 26, 2007

(51) Int. Cl.
H04J 3/04 (2006.01)
(52) U.S. Cl. ........ 370/535; 370/537; 370/538; 370/539; 370/549; 725/32; 725/34; 725/35; 725/36; 725/87
(58) Field of Classification Search .................. 370/535, 370/537, 538, 539, 549; 725/32, 34, 35, 725/36, 87, 88, 89, 90
See application file for complete search history.

(56) References Cited

U.S. PATENT DOCUMENTS

| 6,771,657 | B1 * | 8/2004 | Elstermann .................. 370/465 |
| 2002/0144260 | A1 | 10/2002 | Devara |
| 2003/0163521 | A1 | 8/2003 | Hoshi |
| 2004/0190515 | A1 | 9/2004 | Nogima et al. |
| 2004/0244035 | A1 * | 12/2004 | Wright et al. ................. 725/32 |
| 2005/0066372 | A1 * | 3/2005 | Bertin ........................... 725/114 |
| 2006/0088023 | A1 * | 4/2006 | Muller ........................... 370/350 |
| 2007/0002871 | A1 * | 1/2007 | Pekonen et al. ........ 370/395.42 |
| 2009/0022165 | A1 * | 1/2009 | Candelore et al. ............ 370/400 |
| 2010/0122282 | A1 * | 5/2010 | DuBose ......................... 725/32 |

FOREIGN PATENT DOCUMENTS

| DE | 10139069 A1 * | 2/2003 |
| WO | 0130086 A | 4/2001 |

OTHER PUBLICATIONS

EPC Extended Search Report, Re: Application # 06804144.1-2223/1943847 PCT/US2006037407 Dec. 11, 2009.
CT Cartwright: "Issues in Multiplex and Service Management in Digital Multichannel Broadcasting", pp. 308-313 Sep. 1, 1997.
"Digital Video Broadcasting (DVB); DVB mega-frame for single-frequency network (SFN) synchronization; ETSI TS 101 191", vol. BC, No. V1. 4.1 Jun. 1, 2004.
PCT International Search Report and Written Opinion for PCT/US2006/37407, dated Aug. 29, 2008.

\* cited by examiner

Primary Examiner — Ajit Patel
Assistant Examiner — Khai M Nguyen
(74) Attorney, Agent, or Firm — Stewart M. Wiener (57) ABSTRACT An aspect of the invention relates to a method and apparatus for multiplexing content. In one example, a first transport stream is received. The first transport stream includes a sequence of burst cycles, each of the burst cycles having a plurality of packet bursts respectively associated with a plurality of primary services. In one example, a primary service is a national service. A packet burst stream is received that is associated with a secondary service. In one example, a secondary service is a regional service. The first transport stream is multiplexed with the packet burst stream to produce a second transport stream. The second transport stream includes a deterministic relationship between the plurality of packet bursts in each of the burst cycles and packet bursts of the packet burst stream. Additional packet burst streams associated with additional secondary services may be received and multiplexed in a similar manner.

14 Claims, 7 Drawing Sheets

METHOD AND APPARATUS FOR GENERATING MULTIPLEXED SIGNALS

BACKGROUND OF THE INVENTION

1. Field of the Invention

Embodiments of the present invention generally relate to dither generation of multiplexed signals. More specifically, the present invention relates to a method and apparatus for generating multiplexed signals to be distributed over a single frequency network (SFN).

2. Description of the Related Art

Presently, programming providers desire the ability to deliver regional and national content to handheld mobile devices. Such content is typically delivered to the mobile devices via a single frequency network (SFN), such as a DVB-H network. This content may include various national news, sports, and entertainment channels as well as local news and events channels. In instances where such programming services are delivered from a central distribution point using a bandwidth-constrained link (e.g., satellite), the provisioning of a separate broadcast multiplex signal for each region is inefficient, especially if the number of common (e.g., national) channels is significant. Ideally, a single instance of each national and regional service should be broadcast to the entire DVB-H transmission network so that a custom made multiplexed signal can be constructed at each DVB-H transmission site (e.g., similar to the way national and local programming is multiplexed at a cable headend). Unfortunately, this goal is complicated by time-slicing requirements imposed by the DVB-H standard and the operation of single-frequency networks.

Thus, there is a need in the art for a more effective method and apparatus for delivering national and regional services to DVB-H transmission sites.

SUMMARY OF THE INVENTION

An aspect of the invention relates to a method and apparatus for multiplexing content. In one embodiment, a first transport stream is received. The first transport stream includes a sequence of burst cycles, each of the burst cycles having a plurality of packet bursts respectively associated with a plurality of primary services. In one embodiment, a primary service is a national service. A packet burst stream is received that is associated with a secondary service. In one embodiment, a secondary service is a regional service. The first transport stream is multiplexed with the packet burst stream to produce a second transport stream. The second transport stream includes a deterministic relationship between the plurality of packet bursts in each of the burst cycles and packet bursts of the packet burst stream. Additional packet burst streams associated with additional secondary services may be received and multiplexed in a similar manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
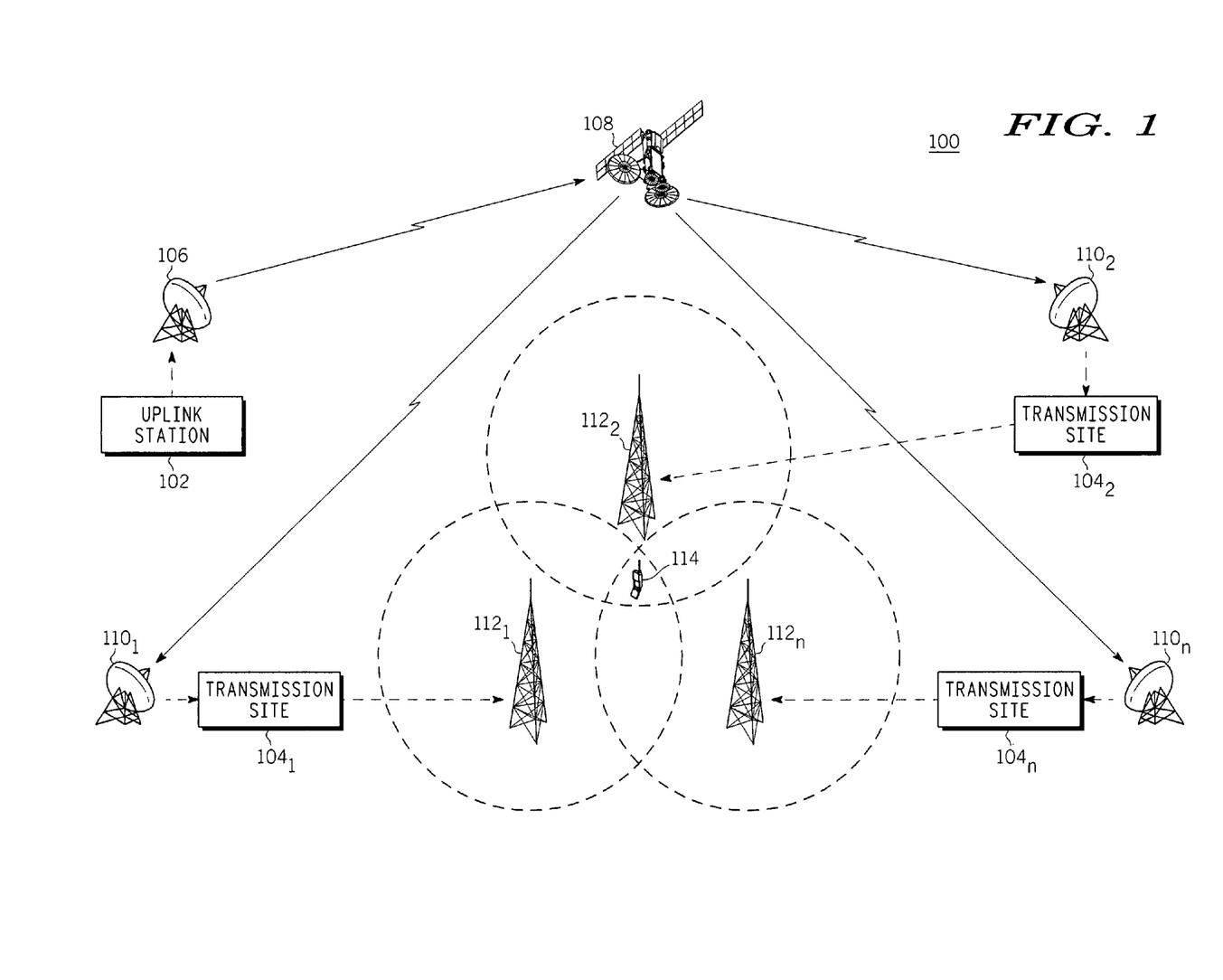
FIG. 1 depicts a block diagram of satellite delivery network in accordance with the present invention.

FIG. 1 depicts one embodiment of a satellite delivery network 100, which includes an uplink station 102, an uplink satellite transmitter 106, at least one distribution satellite 108, a plurality of transmission sites $104_{1...n}$, a corresponding plurality of satellite signal transceivers $110_{1...n}$, and a corresponding plurality of transmission towers (or antennas) $112_{1...n}$. The uplink station 102 may comprise a plurality of servers and/or encoders that provide national and regional programming content. The programming content may be encapsulated for transmission in accordance with Internet Protocol (IP), for example. The resultant content streams are subsequently modulated and provided to the satellite 108 by an uplink satellite transmitter 106. The content streams may be modulated using a phase-shift keying technique, such as QPSK. Although only one satellite 108 is shown in FIG. 1, those skilled in the art will appreciate that a plurality of satellites may be employed. The satellite 108 distributes the modulated content to a plurality of satellite signal receivers $110_{1...n}$. Each of the satellite signal receivers 110 provides the received modulated signal to a respective transmission site 104 for processing. In one embodiment, the transmission sites $104_{1...n}$, which make up a single frequency network (SFN), separately process the received modulated content in a similar manner. One example of an SFN is represented in FIG. 1 by the transmission towers $112_{1...n}$, of which each transmits an identical transport stream. Each transmission site 104 transmits on the same frequency and generates the same exact time synchronized waveform in order to avoid destructive interference at the mobile receiver 114. Thus, interference is minimized in the overlapped regions, e.g., the region containing mobile receiver 114. Although only three towers $112_{1...n}$ are shown in FIG. 1, any number of towers may be used with the present invention. In one embodiment, the SFN comprises a DVB-H transmission network.

Figure 2:
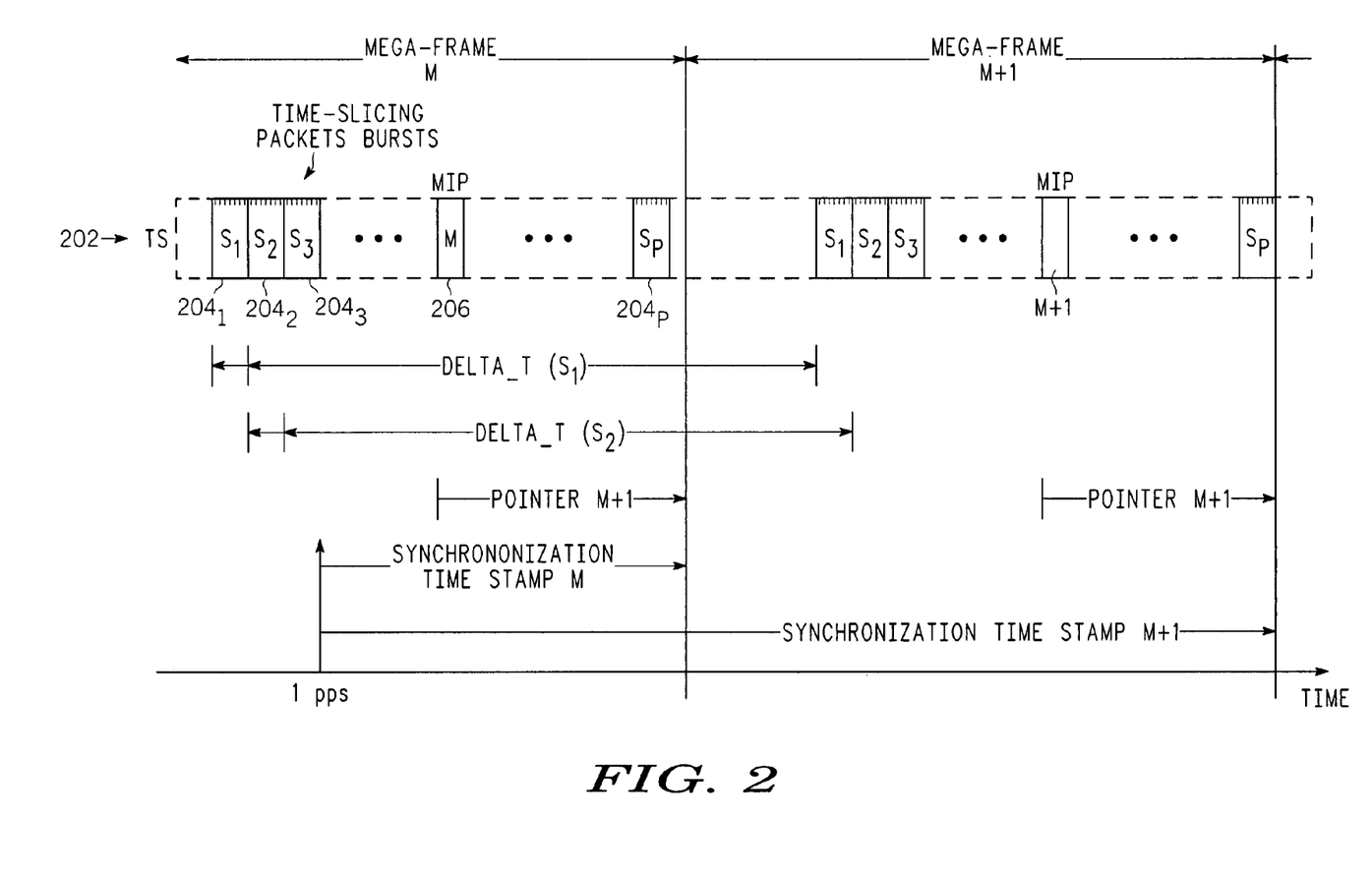
FIG. 2 depicts a block diagram of an exemplary transport stream utilized in accordance with the present invention.

FIG. 2 illustrates an example of a transport stream 202 generated by the transmission sites 104 of FIG. 1. The transport stream comprises a sequence of mega-frames, each of which includes packet bursts and a Mega-frame Initialization Packet (MIP). Each packet burst includes packets for a given content service. In one embodiment, the packets are Moving Picture Experts Group (MPEG) packets (e.g., MPEG-2 transport packets) containing DVB multi-protocol encapsulated (MPE) IP datagrams that are compliant with the well-known DVB-H standard. In order to conserve the power of a mobile receiver, sections of each content service is delivered in packet bursts (e.g., $S_1$ for program 1, $S_2$ for program 2, etc.). During the time between packet bursts of the same content service, certain portions of the mobile receiver circuitry are permitted to "sleep" in order to conserve energy. Although fixed-length packet bursts $204_{1...p}$ for P separate services are depicted in FIG. 2, the packet bursts may be of variable lengths. In one embodiment, the section header of each packet in a burst conveys a value (i.e., delta_t) that specifies the amount of time until the next packet burst of the same program occurs.

FIG. 2 also introduces the concept of a "mega-frame" which is used to facilitate the synchronization of all transmitters comprising an SFN. A mega-frame repeats periodically. In subsequent mega-frames, the packet bursts are typically repeated, but the actual data contained in each packet burst is different from the information contained in the packet burst in the preceding mega-frame. The output of an SFN adapter 312 (see FIG. 3) is a valid MPEG-2 transport stream (e.g., Mux A), where the individual transport stream packets are organized in groups, which constitute a mega-frame. Each mega-frame consists of N consecutive packets, where N is an integer number. Each mega-frame contains exactly one Mega-frame Initialization Packet (MIP). The actual position of the MIP may vary in an arbitrary way from mega-frame to mega-frame. The pointer value in the MIP is used to indicate the start of the following mega-frame.

The SFN transport streams also contain Mega-frame Initialization Packets (MIPs) 206 sent on a well-known packet identifier (PID) that specifies the exact location of mega-frame boundaries relative to a common clock (e.g., GPS-based, 1 pps pulse) using a synchronization time stamp. This ensures synchronized bitstreams are emitted by each transmitter in the SFN. The MIP 206 also includes a pointer specifying the number of transport packets that separate the current packet and the first packet of the succeeding mega-frame. The utilization of MIPs in DVB-H applications is well-known by those skilled in the art.

Although a program provider may synchronize certain services, such as national programs without a considerable amount of trouble, difficulties typically arise if the provider wants to distribute additional services, such as regional or local programs. If regional programming is desired, the transmission sites that constitute a particular SFN must each transmit an identical multiplex signal that includes the same regional content. However, rather than consuming a considerable amount of bandwidth by delivering a unique multiplex to each separate region, one embodiment of the present invention distributes a "master" multiplexed signal that comprises a plurality of national services along with a multitude of various regional programs via a single satellite multiplex to every region.

Figure 3:
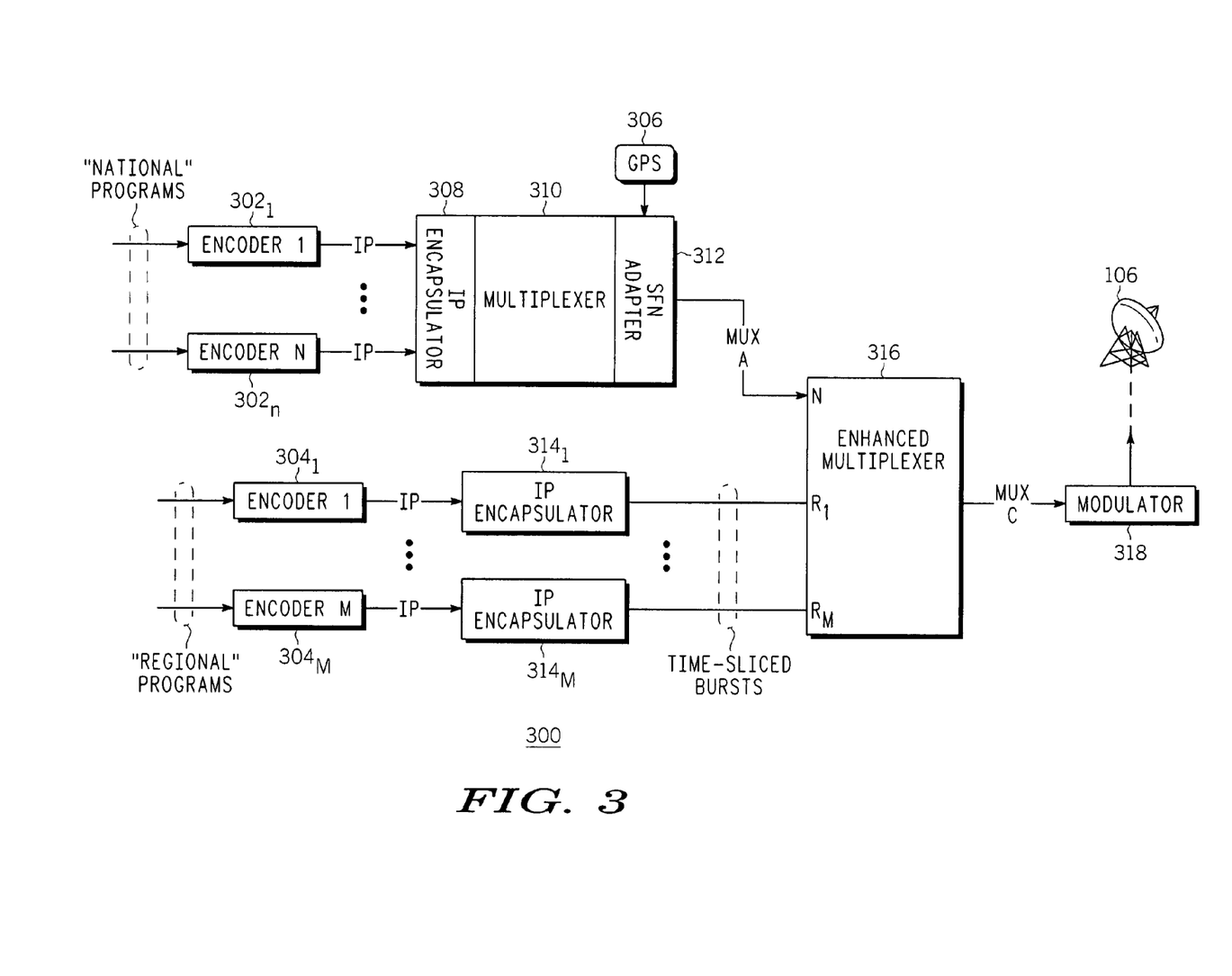
FIG. 3 depicts a block diagram of an exemplary uplink distribution site utilized in accordance with the present invention.

FIG. 3 illustrates one embodiment of an exemplary uplink site 300 that generates the "master" multiplexed signal. The program provider uplink site 300 comprises a plurality of "national program" encoders $302_{1...n}$, an IP encapsulator 308, a multiplexer 310, an SFN adapter 312, a plurality of "regional program" encoders $304_{1...m}$, a corresponding plurality of regional IP encapsulators $314_{1...m}$, an enhanced multiplexer 316, a modulator 318, and a satellite signal transmitter 106.

The national program encoders $302_{1...n}$ receive national programming content from the program provider for encoding. The encoded signals are then forwarded to the IP encapsulator 308 for encapsulation. The multiplexer 310 multiplexes the encapsulated content to produce a transport stream. The SFN adapter 312 embeds MIP packets into the transport stream. The MIP packets provide timing information based on time signals obtained from GPS satellites 306. The resulting transport stream is referred to as multiplex A ("Mux A"). Mux A is an autonomous transport stream having packet bursts for each of the N national services (e.g., national content data), null packets, program specific information (PSI), system information (SI), electronic system guide (ESG) data, and MIP packets. By "autonomous", it is meant that the transport stream can be provided to mobile receivers for processing. In one embodiment, the resulting transport stream is compliant with DVB-H, where each mega-frame includes a packet burst from each of the N national services. The Mux A signal is then provided to the enhanced multiplexer 316.

Similarly, the regional encoders $304_{1...m}$ receive regional content from the program provider for encoding. The encoded signals are then provided to corresponding IP encapsulators $314_{1...m}$ for encapsulation. Each IP encapsulator 314 provides a regional stream to the enhanced multiplexer 316. Each regional stream includes packet bursts for a given regional service. Once received by the enhanced multiplexer 316, the regional streams are combined with the Mux A signal to form the "master" multiplexed signal, Mux C. The enhanced multiplexer 316 multiplexes the input signals on a packet burst basis. Notably, the enhanced multiplexer 316 is configured to ensure a deterministic relationship between packet bursts of each regional stream and packet bursts of Mux A (i.e., national packet bursts). After being processed by the enhanced multiplexer 316, the combined multiplexed signal (i.e., "Mux C") is provided to a modulator 318 for distribution to a satellite via the uplink satellite signal transmitter 106.

Figure 5:
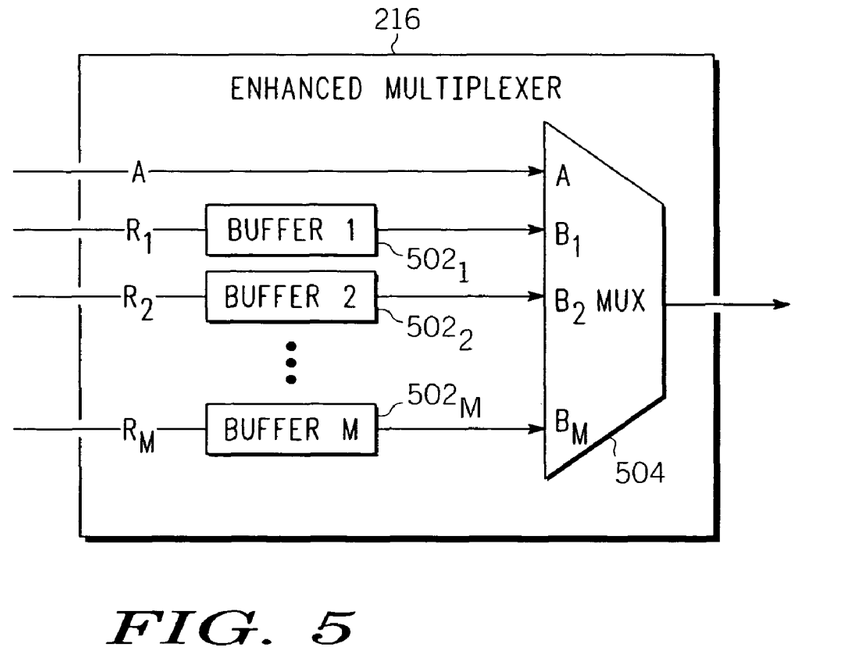
FIG. 5 depicts a block diagram of an exemplary enhanced multiplexer utilized in accordance with the present invention.

The enhanced multiplexer 316 depicted in FIG. 3 is shown in greater detail in FIG. 5. The multiplexer 316 is configured to establish a deterministic relationship between each national and regional packet burst. The enhanced Mux associates each regional packet burst with one of the national packet bursts. For example, an uplink system operator specifies at least one regional service (e.g., CNN-LA, CNN-NY, etc.) to be associated with a given national service (e.g., CNN-USA). A controller at the uplink station 102 then translates this relationship in a manner that can be processed by the enhanced multiplexer (e.g., PID X and PID Y are associated with national PID Z). The enhanced multiplexer 310 ensures that no more than one packet burst from each regional transport stream commences after an associated national packet burst. Conversely, if a typical MPEG-2 multiplexer was utilized, packet jitter could inadvertently cause two consecutive regional bursts to occur between consecutive national bursts.

The enhanced multiplexer 316 comprises a plurality of buffers $502_{1...m}$ and a multiplexing module 504. Each of the buffers $502_{1...m}$ individually receives a regional stream from the IP encapsulators 214 as shown in FIG. 2. Notably, each of the M regional streams is buffered prior to being multiplexed. The enhanced multiplexer 216 is configured to associate each regional stream ($R_1$ through $R_M$) with a particular national service in a Mux A. For example, suppose a relationship is established between national service 1 and regional service 2. In this scenario, $R_2$ packet bursts are held in Buffer 2 until the multiplexer 504 outputs the first packet burst of the $N_1$ national service in Mux A. The multiplexer's $B_2$ input is then unlocked and all packets up to and including the last packet of the packet burst are injected into the output multiplex (Mux C). The $B_2$ input is locked again until after the beginning of the next $N_1$ packet burst in Mux A. This effectively guarantees that the first $N_1$ packet burst always precedes the first $R_2$ packet burst in the output multiplex Mux C. This also ensures uniform Add/Drop Multiplexer (ADM) behavior downstream and guarantees the modulators at the transmission sites in the same region will produce the same waveform.

After the Mux C signal is modulated, the satellite signal transmitter 106 provides the signal to at least one satellite 108, which then distributes the signal to all the transmission sites $104_1 \ldots _n$ (see FIG. 1). After receiving the "master" multiplexed signal, the transmission site at each region constructs a "unique" multiplexed signal. Depending on the embodiment, this unique multiplexed signal may comprise entirely of national programming content (i.e., Mux A without any regional programs) or the signal may include a plurality of the national services along with at least one regional service that is pertinent to the area. Single frequency networks configured to solely broadcast national services only utilize the autonomous "Mux A" transport stream. In one embodiment, this may be accomplished by the ADM, which discards all filler packets, null packets, and regional transport packets in Mux C (i.e., recovering Mux A from Mux C). Alternatively, the present invention can provide regional content by selecting a regional service and substituting it in the place of an original national service. In one embodiment, this process is achieved by performing an add/drop packet substitution at each of the regional transmission sites.

Figure 4:
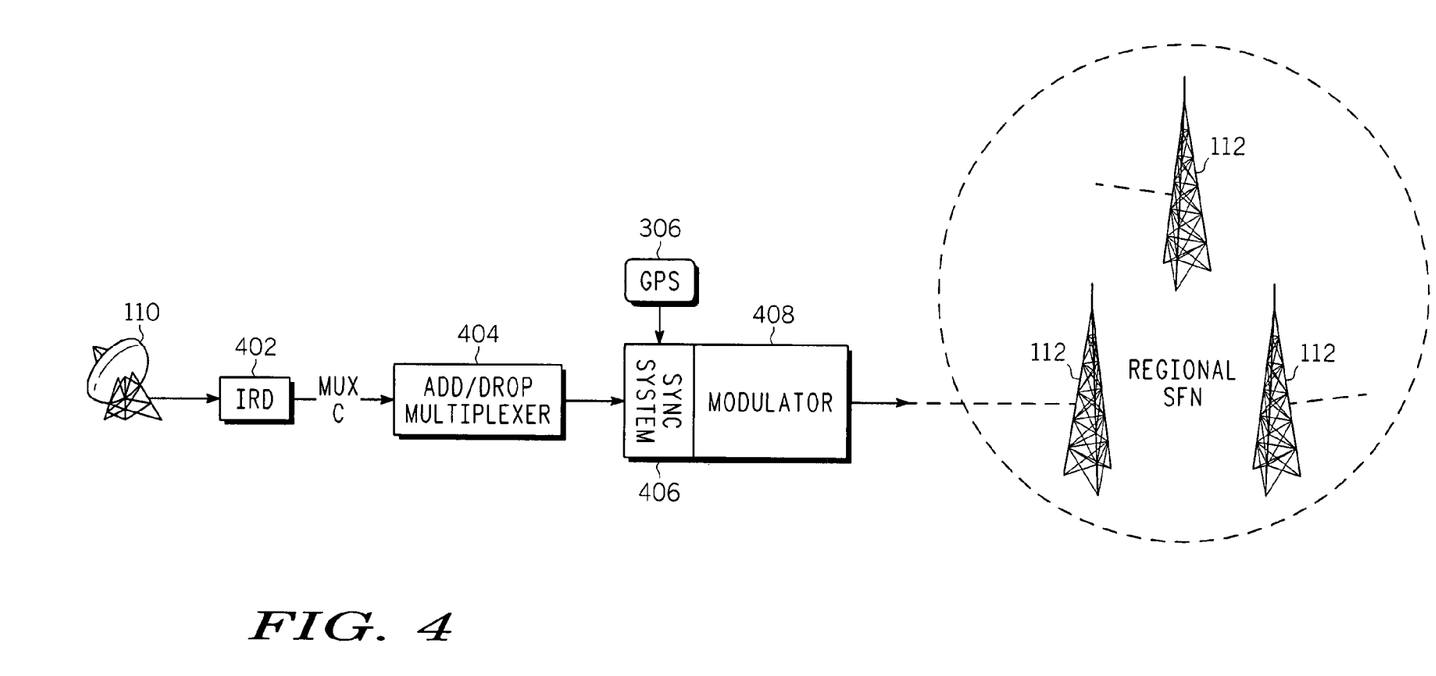
FIG. 4 depicts a block diagram of an exemplary downlink transmission site utilized in accordance with the present invention.

However, the transmission site must further process the Mux C signal in order to distribute regional programming. One embodiment of a downlink transmission site 104 is depicted in FIG. 4. The satellite signal receiver 110 at a given transmission site receives the Mux C signal from the satellite 106 and forwards it to an integrated receiver decoder (IRD) 402 or other receiving device. The IRD 402 then provides the signal to an add/drop multiplexer (ADM) 404, which is responsible for packet burst substitutions. Specifically, the ADM 404 replaces certain Mux A packet bursts (e.g., the national packet bursts) with one or more regional stream packet bursts. Once the packet insertion process is completed, the ADM produces an autonomous transport stream and provides it to the sync system 406. The sync system is used for processing the timing information conveyed by the MIP packets. This timing information guarantees that each modulator 408 in the SFN produces a time-synchronized waveform. The modulator 408 is responsible for processing the transport stream from the ADM (via the sync system 406) and forwards the modulated signal to a transmission tower 112. It is important to note that all transmission sites constituting an SFN constructs an identical, synchronized waveform. Thus, the ADM at each transmission site generates an identical transport stream.

Figure 6:
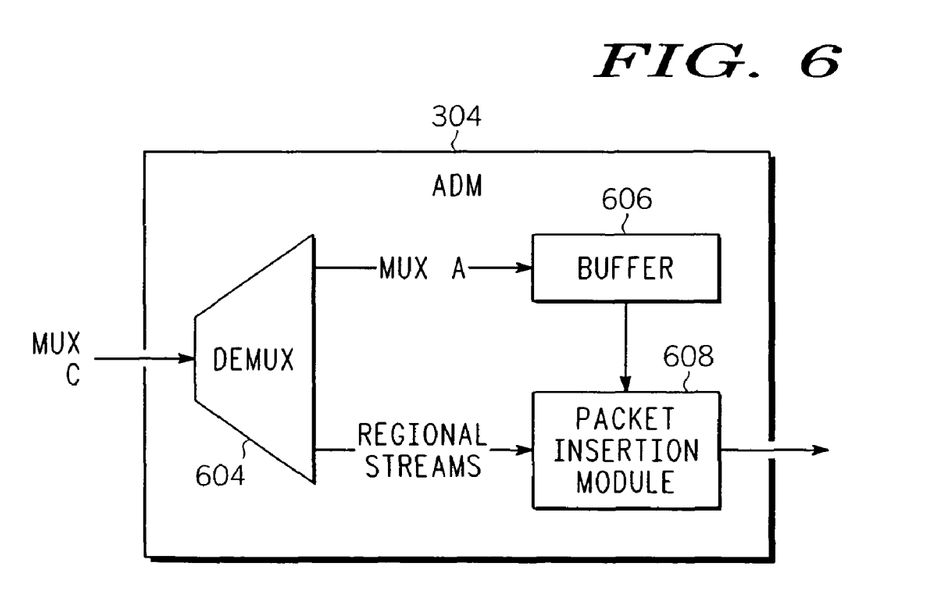
FIG. 6 depicts a block diagram of an exemplary add/drop multiplexer (ADM) utilized in accordance with the present invention.

FIG. 6 illustrates one embodiment of an ADM that comprises a demultiplexer 604, a buffer 606, and a packet insertion module 608. The demultiplexer 604 receives the Mux C signal and separates the primary multiplex (e.g., Mux A) from the regional streams. The primary multiplex, Mux A, is forwarded to the buffer 606 while the regional streams are provided directly to the packet insertion module 608. Mux A is buffered and subsequently forwarded to the packet insertion module 608 in a manner that allows for the substitution of national packet bursts with regional packet bursts. In one embodiment, the ADM may be programmed to substitute a particular national service with a certain corresponding regional service. Namely, the packet insertion module 608 locates the appropriate regional burst that needs to be inserted and then aliases the regional burst PID to match the corresponding national packet burst stream PID. The packet insertion module 608 then replaces the national packets with regional packets as the national transport stream enters the packet insertion module 608. The module 608 may also insert fixed null packets if the national burst length exceeds the regional burst length.

The packet insertion module 608 may also need to re-compute certain real-time parameters included in each regional MPE section header based on the information conveyed in the corresponding national MPE sections. Specifically, a delta_t value indicating the number of 10 millisecond ticks until the start of the next time slice burst may need to be calculated. Since this timing parameter is supplied in the national bursts (see "T1" in FIG. 7), all ADMs are able to calculate the same revised regional delta_t values. However, if the national stream and associated regional streams employ identical encoder and IP encapsulator configurations in a manner that allow the packet bursts to be synchronized, this extra step may be avoided.

One important restriction pertaining to the packet burst substitution is that the regional stream rate (and burst size) must not exceed the associated national stream's rate (and burst size). However, due to slight encoder timing differences, it may be possible for the number of regional burst packets to occasionally exceed the national burst length. In this case, the packet insertion module 608 should replace the null packet(s) immediately following the national burst with the excess regional data burst packet(s). Although, any excess must not "leak" into the next burst cycle.

Finally, the encoders used to supply the network transport stream and its related regional streams should employ identical multicast destination IP addresses, making the Add/Drop operation transparent to DVB-H terminals. Otherwise, electronic system guide (ESG) and system information (SI) data must be updated. A more sophisticated system could have the uplink generate unique regional ESG/SI PID streams which the ADM substitutes in place of the national ESG/SI PID streams. This would allow a regional stream to be associated with any national stream (assuming similar encoding and encapsulation configurations exist).

Figure 7:
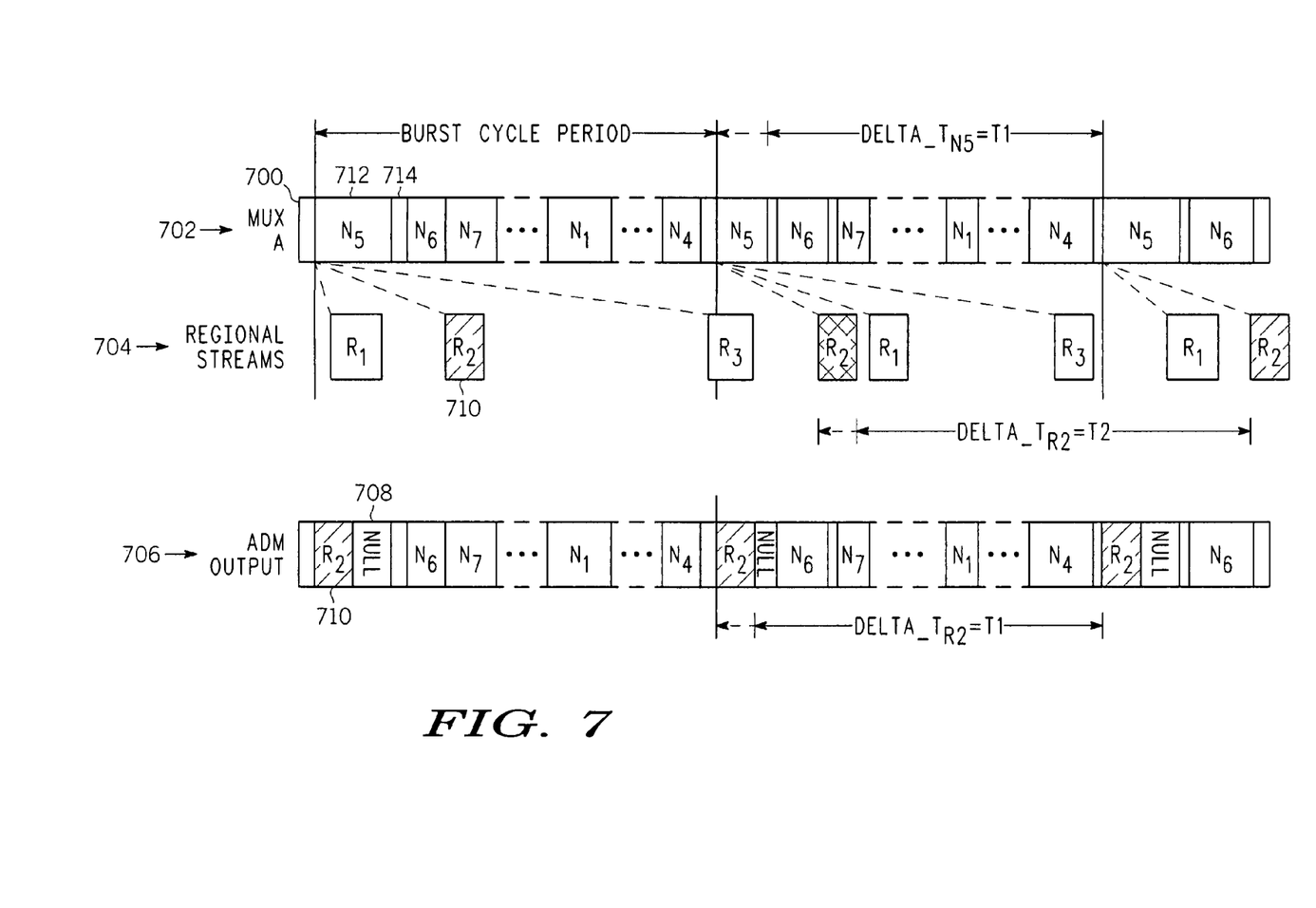
FIG. 7 depicts a block diagram of an exemplary ADM transport stream utilized in accordance with the present invention.

FIG. 7 illustrates an example of the ADM packet burst insertion process. In this example, regional streams 1, 2, and 3 (represented by $R_1$, $R_2$, and $R_3$ respectively) are associated with national service 5 ($N_5$) 712. The master transport stream 700 is represented by "Mux A" in the first row 702 of FIG. 7, whereas the regional streams are depicted in the second row 704. The third row 706 illustrates the substitution of national stream $N_5$ 712 with the regional stream $R_2$ 710 in the ADM output signal ($R_1$ and $R_3$ could be inserted in a similar manner if associated with $N_5$). This figure also demonstrates that if the regional packet burst is smaller than the national packet burst, then the regional packet burst will have an appropriate number of null packets 708 appended to the end of the packet burst to accommodate the difference in size. Conversely, if the regional packet burst is larger than the national packet burst, the substitution may still be made so long as there are sufficient null packets 714 separating the relevant national packet burst from the ensuing national packet burst (i.e., upon insertion into the transport stream, the regional packet burst cannot overlap a subsequent packet burst as mentioned above).

Figure 8:
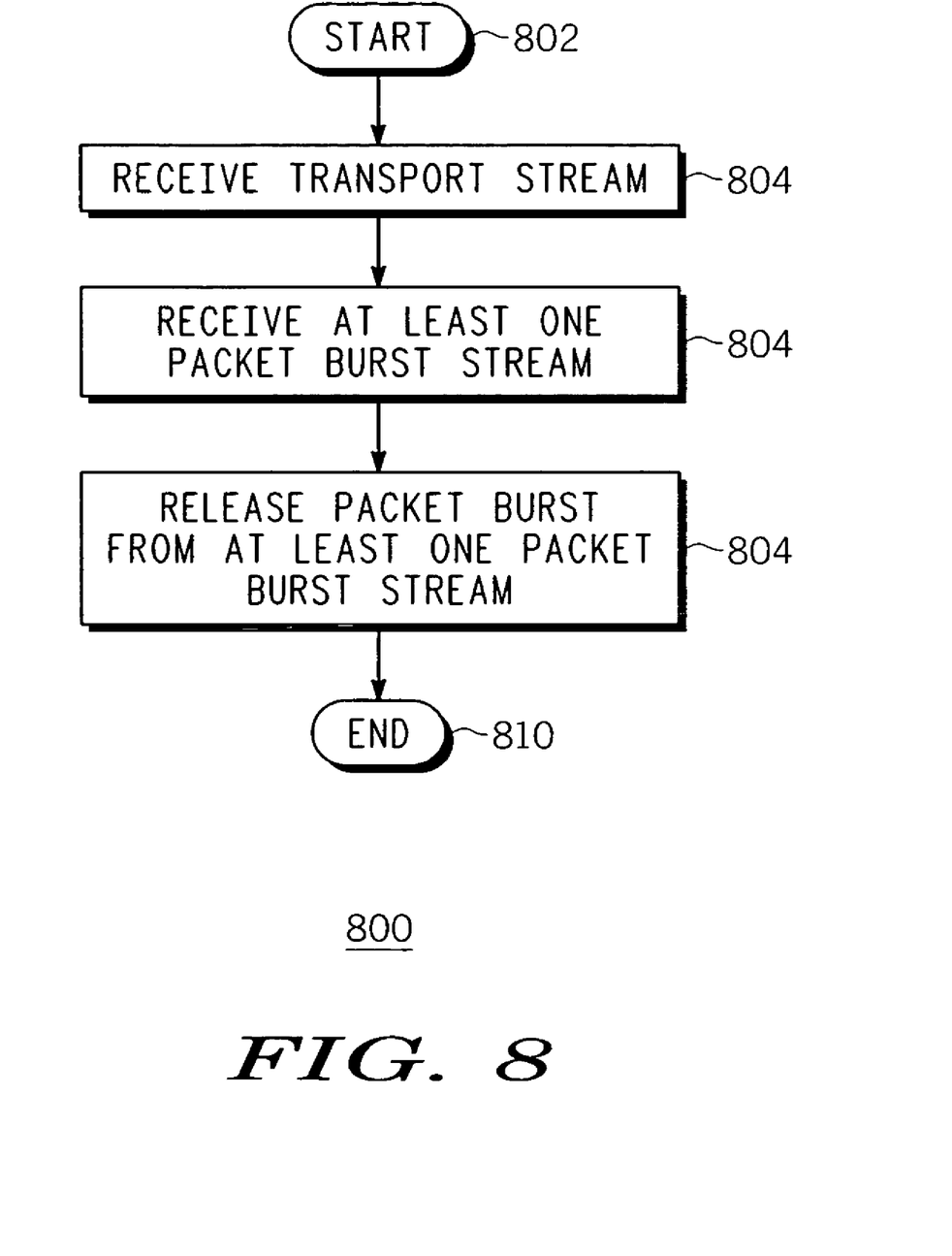
FIG. 8 depicts a method for producing transport streams in accordance with the present invention.

FIG. 8 illustrates a method 800 for utilizing satellite content over a distribution network in accordance with the present invention. Method 800 begins at step 802 and proceeds to step 804, where a transport stream comprising a sequence of packet bursts associated with a plurality of primary services (e.g., national channels) is received. In one embodiment, the transport stream comprises a sequence of mega-frames. Each mega-frame includes a number of time-sliced packet bursts that each represents a portion of a national program. Only one packet burst from each of the different types of packet bursts (e.g., a particular national program) occurs during a burst cycle.

At step 806, at least one packet burst stream associated with a respective at least one secondary service is received. In one embodiment, the enhanced multiplexer receives a multitude of regional programming streams (i.e., secondary services). Each of the packet streams is then associated with at least one of the different national programs. In one embodiment, this association is programmed by an operator who specifies which national stream(s) may be substituted as well as the corresponding regional stream(s).

At step 808, a packet burst from the at least one of the packet burst stream is released. In one embodiment, the enhanced multiplexer buffers the regional transport streams in a manner that guarantees that only one packet burst of a regional program is utilized once every burst cycle. More specifically, a given buffer will not release a data burst from the buffered regional program unless a packet burst from an associated packet burst set occurs first. Thus, the enhanced multiplexer is able to ensure that the construct multiplexed signal is comprised of national packet bursts followed by associated data bursts. Furthermore, the enhanced multiplexer constructs the multiplexed signal in a series of cycles. Each cycle comprises of a single data burst from each national channel. In addition, each cycle may consist of only one data burst from each of the regional transport streams. The method 800 then ends at step 810.

While the foregoing is directed to embodiments of the present invention, other and further embodiments of the invention may be devised without departing from the basic scope thereof, and the scope thereof is determined by the claims that follow.

The invention claimed is:

1. A method of multiplexing content, comprising:
   receiving a first transport stream including a sequence of burst cycles, each of the burst cycles having a plurality of packet bursts respectively associated with a plurality of primary services;
   receiving at least one packet burst stream associated with a respective at least one secondary service wherein each secondary service is associated with one primary service; and
   multiplexing the first transport stream with the at least one packet burst stream to produce a second transport stream comprised of a plurality of mega-frames wherein each mega-frame contains only one packet burst from the primary service and only one packet burst from the at least one secondary service and the packet burst from the primary service precedes the packet burst from the at least one secondary service.

2. The method of claim 1, wherein the each of the plurality of primary services comprises one of a plurality of national services, and the at least one secondary service respectively comprises at least one regional service.

3. The method of claim 1, wherein each of the first transport stream and the second transport stream comprises a Moving Picture Experts Group (MPEG) transport stream.

4. The method of claim 1, wherein the first transport stream comprises an autonomous transport stream having at least one of: national content data, null packet data, program specific information (PSI), system information (SI), electronic system guide (ESG) data, or mega-frame initialization packet (MIP) data.

5. A system for multiplexing content, comprising:
   a multiplexer for receiving a first transport stream including a sequence of burst cycles, each of the burst cycles having a plurality of packet bursts respectively associated with a plurality of primary services, receiving a packet burst stream associated with a secondary service, and multiplexing the first transport stream with the packet burst stream to produce a second transport stream, wherein the second transport stream organizes the packet bursts from the first transport stream and the packet burst stream associated with the secondary service into mega-frames wherein each mega-frame includes only one packet burst associated with the one primary service preceding only one packet burst associated with the secondary service.

6. The system of claim 5 further comprising:
   an add/drop multiplexer configured to produce a third transport stream from the second transport stream by replacing a packet burst associated with one of the plurality of primary services with the one of the packet bursts associated with one of the secondary services.

7. The system of claim 6, further comprising: a modulator for transmitting the third transport stream over a single frequency network.

8. The system of claim 5, wherein the each of the plurality of primary services comprises one of a plurality of national services, and the secondary service comprises a regional service.

9. The system of claim 5, wherein each of the first transport stream and the second transport stream comprises a Moving Picture Experts Group (MPEG) transport stream.

10. The system of claim 5, wherein the first transport stream comprises an autonomous transport stream having at least one of: national content data, null packet data, program specific information (PSI), system information (SI), electronic system guide (ESG) data, or mega-frame initialization packet (MIP) data.

11. Apparatus for multiplexing content, comprising:
    means for receiving a first transport stream including a sequence of burst cycles, each of the burst cycles having a plurality of packet bursts respectively associated with a plurality of primary services;
    means for receiving at least one packet burst stream associated with a respective at least one secondary service wherein each secondary service is associated with one primary service; and
    means for multiplexing the first transport stream with the at least one packet burst stream to produce a second transport stream comprised of a plurality of mega-frames wherein each mega-frame contains only one packet burst from the primary service and only one packet burst from the at least one secondary service and the packet burst from the primary service precedes the packet burst from the at least one secondary service.

12. The apparatus of claim 11, wherein the each of the plurality of primary services comprises one of a plurality of national services, and the at least one secondary service respectively comprises at least one regional service.

13. The apparatus of claim 11, wherein each of the first transport stream and the second transport stream comprises a Moving Picture Experts Group (MPEG) transport stream.

14. The apparatus of claim 11, wherein the first transport stream comprises an autonomous transport stream having at least one of: national content data, null packet data, program specific information (PSI), system information (SI), electronic system guide (ESG) data, or mega-frame initialization packet (MIP) data.

* * * * *